(12) United States Patent
Tsai et al.

(10) Patent No.: US 8,302,112 B2
(45) Date of Patent: Oct. 30, 2012

(54) OPTICAL DISC PLAYER WITH DECELERATING MEMBER FOR STOPPING ROTATING DISC

(75) Inventors: Sung-Feng Tsai, Taipei Hsien (TW); Chin-Chia Chang, Tu-Cheng (TW); Fu-Pin Hsieh, Taipei Hsien (TW); Teng-Yuan Chang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 224 days.

(21) Appl. No.: 12/870,986

(22) Filed: Aug. 30, 2010

(65) Prior Publication Data

US 2011/0265104 A1 Oct. 27, 2011

(30) Foreign Application Priority Data

Apr. 23, 2010 (CN) .............................. 2010 1 015435

(51) Int. Cl.
*G11B 17/04* (2006.01)

(52) U.S. Cl. ....................................................... 720/602

(58) Field of Classification Search .................. 720/601, 720/602, 604
See application file for complete search history.

(56) References Cited

U.S. PATENT DOCUMENTS

| 5,883,870 | A  | * | 3/1999 | Akiba et al. ................... 720/602 |
| 7,647,602 | B2 | * | 1/2010 | Morita ............................ 720/728 |
| 2005/0050558 | A1 | * | 3/2005 | Lee et al. ...................... 720/601 |
| 2011/0197210 | A1 | * | 8/2011 | Yamasaki et al. ............. 720/604 |

FOREIGN PATENT DOCUMENTS

| JP | 09-212999 | * | 8/1997 |
| JP | 09-213000 | * | 8/1997 |
| JP | 2003141812 | * | 5/2003 |
| JP | 2004281048 | * | 10/2004 |
| JP | 2010176737 | * | 8/2010 |

* cited by examiner

*Primary Examiner* — Angel A. Castro
(74) *Attorney, Agent, or Firm* — Altis Law Group, Inc.

(57) ABSTRACT

An optical disc player includes a case, a tray received in the case, and a decelerating member. The tray is adapted to hold an optical disc. The decelerating member integrates with the case, and is capable of stopping the rotating optical disc by friction generated between the decelerating member and edge of the rotating optical disc.

17 Claims, 3 Drawing Sheets

OPTICAL DISC PLAYER WITH DECELERATING MEMBER FOR STOPPING ROTATING DISC

BACKGROUND

1. Technical Field

The present disclosure relates to optical disc players, and particularly to an optical disc player that is easy to be assembled.

2. Description of Related Art

An optical disc player often includes a lower housing, an upper housing, and a tray. The tray is used for holding an optical disc. The lower housing combines with the upper hosing to form a receiving space for accommodating the tray. The lower housing often includes a decelerating member for stopping the rotating optical disc when the tray and the rotating optical disc are ejected from the receiving space.

However, it takes time assembling the decelerating member. Therefore, there is room for improvement in the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
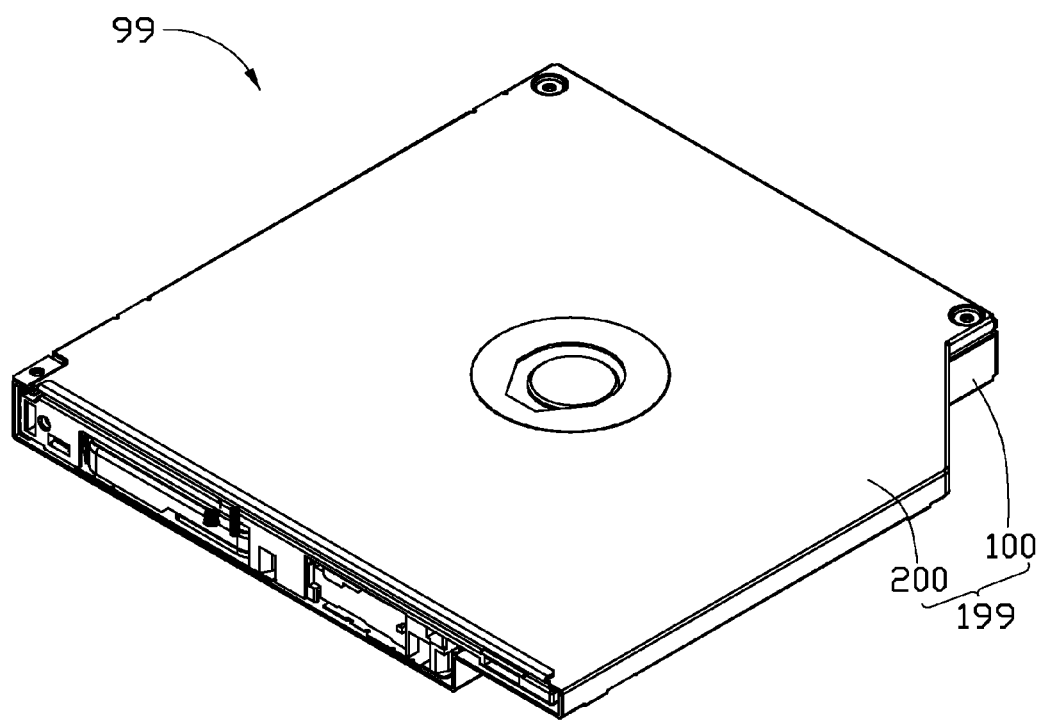
FIG. 1 is a perspective view of an optical disc player in accordance with an exemplary embodiment. The optical disc player includes a lower housing.
Figure 2:
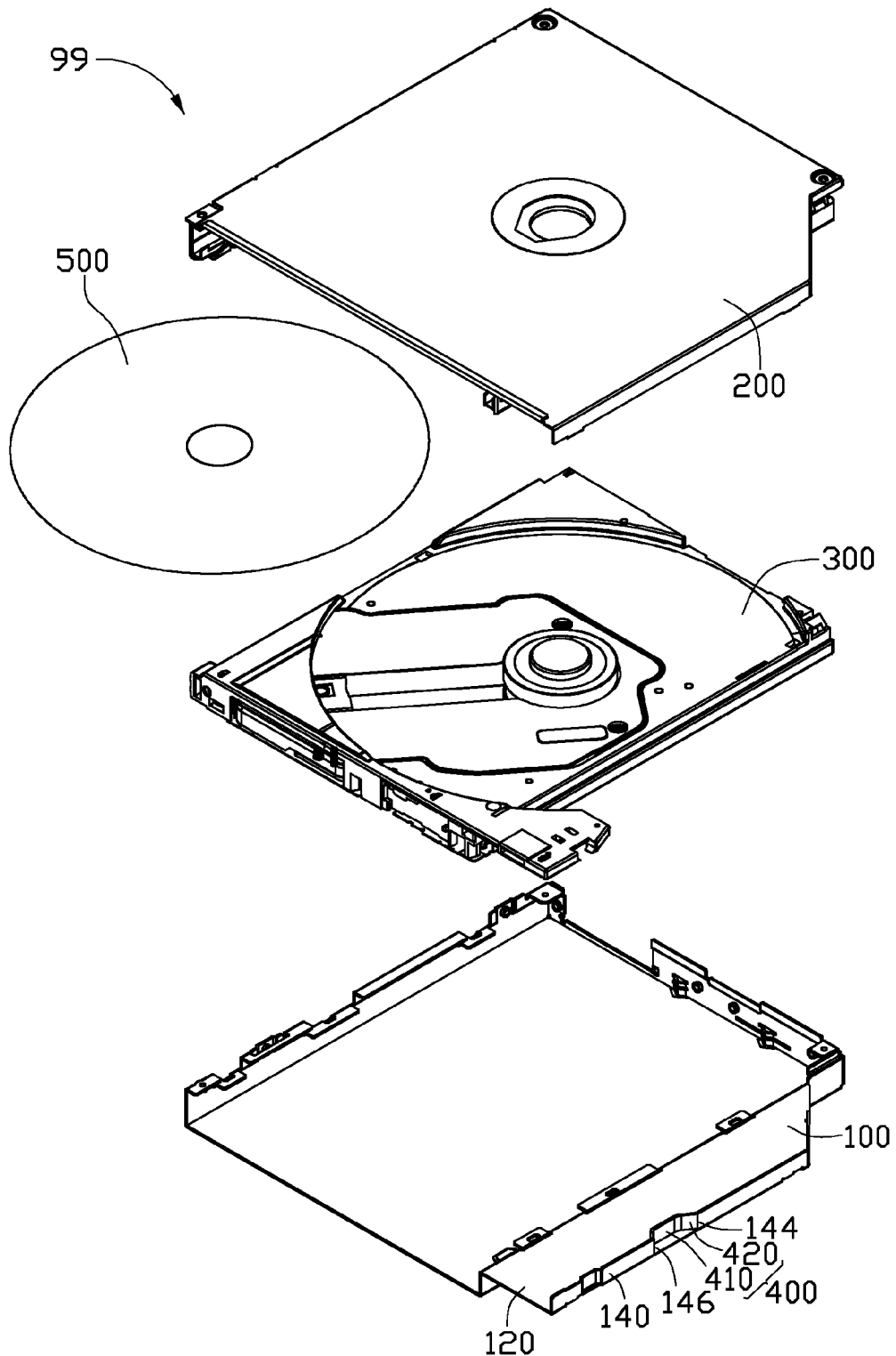
FIG. 2 is an exploded view of the optical disc player of FIG. 1.
Figure 3:
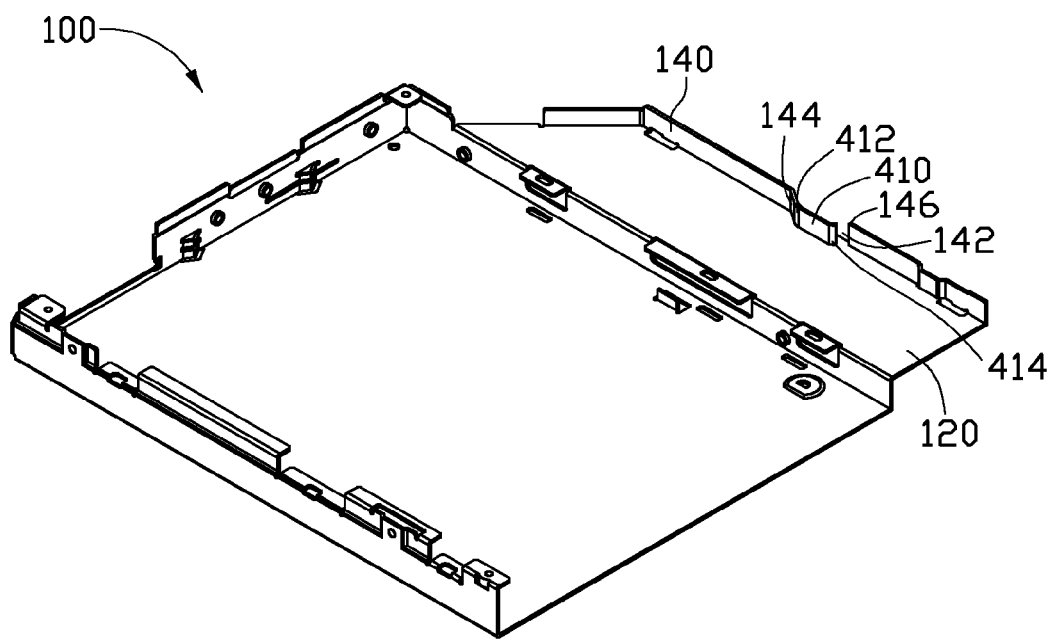
FIG. 3 is a perspective view of the lower housing of FIG. 1.

Referring to FIGS. 1 to 3, an optical disc player 99 includes a case 199, and a tray 300 received in the casing 199. The case 199 includes a lower housing 100, and an upper housing 200. The lower housing 100 and the upper housing 200 combine to form a receiving space for accommodating the tray 300. The tray 300 is used for holding an optical disc 500.

The lower housing 100 includes a base sheet 120, and a strip shaped sidewall 140 upwardly extending from the base sheet 120. The sidewall 140 defines an opening 142, and a first edge 144 and a second edge 146 surrounding the opening 142 that are formed at the same time. The first edge 144 and the second edge 146 are parallel with each other.

The optical disc player 99 further includes a decelerating member 400 extending from the first edge 144 into the lower housing 100. The position of the decelerating member 400 is corresponding to that of the opening 142.

The decelerating member 400 and the sidewall 140 are integrated. The decelerating member 400 includes a decelerating portion 410 and a connecting portion 420. The decelerating portion 410 is parallel to the sidewall 140. The connecting portion 420 obliquely connects the first edge 144 of the sidewall 140 and the decelerating portion 410, and when the decelerating portion 410 is pressed, the connecting portion 420 is capable of flexing such that the decelerating portion 410 can move.

Opposite ends of the decelerating portion 410 obliquely extend towards the sidewall 140 to respectively form a first guiding surface 412 and a second guiding surface 414. The first guiding surface 412 connects with the connecting portion 420. The second guiding surface 414 is the free end of the decelerating portion 410.

When a rotating disc 500 and the tray 300 are ejected out of the case 199, friction will be generated between the decelerating portion 410 and edge of the rotating optical disc 500, thus the rotating optical disc 500 will decelerate and finally stop rotating. Meanwhile, the decelerating portion 410 is pressed by the rotating optical disc 500 to move and drive the connecting portion 420 to flex towards the opening 142, thus wear and tear of the rotating optical disc 500 caused by the friction is decreased. Furthermore, the decelerating member 400 and the sidewall 140 are integrated, thus the optical disc player 99 is more easily assembled than the prior optical disc players.

In addition, the first guiding surface 412 acts as a guide while the tray 300 is ejected out of the case 199, and the second guiding surface 414 acts as a guide while the tray 300 is inserted into the case 199. Furthermore, the opening 142 can provide space for flexing the decelerating member 400.

It is to be understood, however, that even though information and advantages of the present embodiments have been set forth in the foregoing description, together with details of the structures and functions of the present embodiments, the disclosure is illustrative only; and that changes may be made in detail, especially in matters of shape, size, and arrangement of parts within the principles of the present embodiments to the full extent indicated by the broad general meaning of the terms in which the appended claims are expressed.

What is claimed is:

1. An optical disc player, comprising:
    a case;
    a tray received in the case, the tray adapted to hold an optical disc; and
    a decelerating member connecting with the case, the decelerating member capable of stopping the rotating optical disc by friction generated between the decelerating member and edge of the rotating optical disc;
        wherein the decelerating member comprises a decelerating portion, and a connecting portion connecting the case and the decelerating portion; the rotating optical disc presses the decelerating portion to move and causes the connecting portion to flex.

2. The optical disc player according to claim 1, wherein the case defines an opening, and the opening is capable of providing space for flexing the decelerating member.

3. The optical disc player according to claim 2, wherein the position of the opening is corresponding to that of the decelerating member.

4. The optical disc player according to claim 1, wherein the decelerating portion defines a first guiding surface at the end of the connecting portion, the first guiding surface is capable of acting as a guide when the tray is ejected out of the case.

5. The optical disc player according to claim 1, wherein the decelerating portion defines a second guiding surface at the free end, the second guiding surface is capable of acting as a guide when the tray is inserted into the case.

6. The optical disc player according to claim 1, wherein the case comprises a lower housing and an upper housing, the upper housing combines with the lower housing to form a receiving space for accommodating the tray; the lower housing comprises a base sheet and a sidewall upwardly extending from the base sheet, the decelerating member extending from the sidewall into the lower housing.

7. The optical disc player according to claim 6, wherein the decelerating member comprises a decelerating portion parallel to the sidewall, and a connecting portion obliquely connecting the sidewall and the decelerating portion.

8. An optical disc player, comprising:
a case comprising an upper housing and a lower housing, the lower housing and the upper housing combining to form a receiving space, the lower housing comprising a base sheet, and a sidewall upwardly extending from the base sheet;
a tray received in the receiving space, the tray adapted to hold an optical disc; and
a decelerating member comprising a decelerating portion and a connecting portion connecting the decelerating portion and the sidewall, the decelerating portion adapted to stop the rotating optical disc when the tray and the rotating optical disc are ejected out of the case;
wherein the decelerating portion defines a first guiding surface at the end of connecting portion, the first guiding surface is capable of acting as a guide when the tray is ejected out of the case.

9. The optical disc player according to claim 8, wherein the decelerating member integrates with the sidewall.

10. The optical disc player according to claim 9, wherein the rotating optical disc presses the decelerating portion to move and causes the connecting portion to flex towards the sidewall.

11. The optical disc player according to claim 10, wherein the sidewall defines an opening for providing space for flexing the decelerating member.

12. The optical disc player according to claim 11, wherein the position of the opening is corresponding to the decelerating member.

13. The optical disc player according to claim 8, wherein the decelerating portion stops the rotating optical disc by friction generated between the decelerating portion and edge of the rotating optical disc.

14. The optical disc player according to claim 8, wherein the decelerating portion is parallel to the sidewall, and the connecting portion obliquely connects the sidewall and the decelerating portion.

15. The optical disc player according to claim 8, wherein the decelerating portion defines a second guiding surface at the free end, the second guiding surface is capable of acting as a guide when the tray is inserted into the case.

16. An optical disc player, comprising:
a case comprising a lower housing and an upper housing, the upper housing combines with the lower housing to form a receiving space, the lower housing comprising a base sheet and a sidewall upwardly extending from the base sheet;
a tray received in the receiving space, the tray adapted to hold an optical disc; and
a decelerating member extending from the sidewall into the lower housing; the decelerating member comprising a decelerating portion parallel to the sidewall, and a connecting portion obliquely connecting the sidewall and the decelerating portion, the decelerating portion adapted to stop the rotating optical disc when the tray and the rotating optical disc are ejected out of the case.

17. The optical disc player of claim 16, wherein the sidewall defines an opening for providing space for flexing the decelerating member.

* * * * *

UNITED STATES PATENT AND TRADEMARK OFFICE
CERTIFICATE OF CORRECTION

PATENT NO. : 8,302,112 B2  Page 1 of 1
APPLICATION NO. : 12/870986
DATED : October 30, 2012
INVENTOR(S) : Sung-Feng Tsai et al.

It is certified that error appears in the above-identified patent and that said Letters Patent is hereby corrected as shown below:

On the Title Page

Please replace Item (30) regarding "Foreign Application Priority Data" with the following:

(30)    Foreign Application Priority Data

Apr. 23, 2010   (CN) ......................2010 1 0154352

Signed and Sealed this
Twenty-fourth Day of December, 2013

Margaret A. Focarino
*Commissioner for Patents of the United States Patent and Trademark Office*